(12) United States Patent
Yu (10) Patent No.: US 11,117,652 B2
(45) Date of Patent: Sep. 14, 2021

(54) MOTOR FOR DRONE AND DRONE INCLUDING SAME

(71) Applicant: LG INNOTEK CO., LTD., Seoul (KR)

(72) Inventor: Hyun Soo Yu, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 332 days.

(21) Appl. No.: 16/322,392

(22) PCT Filed: Aug. 3, 2017

(86) PCT No.: PCT/KR2017/008391
§ 371 (c)(1),
(2) Date: Jan. 31, 2019

(87) PCT Pub. No.: WO2018/026207
PCT Pub. Date: Feb. 8, 2018

(65) Prior Publication Data
US 2019/0193849 A1 Jun. 27, 2019

(30) Foreign Application Priority Data

Aug. 3, 2016 (KR) .......................... 10-2016-0098918

(51) Int. Cl.
*B64C 27/32* (2006.01)
*B64C 39/02* (2006.01)
(Continued)

(52) U.S. Cl.
CPC .............. *B64C 27/32* (2013.01); *B64C 27/12* (2013.01); *B64C 39/02* (2013.01); *B64C 39/024* (2013.01);
(Continued)

(58) Field of Classification Search
CPC .......... B64C 27/12; B64C 27/32; B64C 39/02; B64C 39/024; B64C 2201/027;
(Continued)

(56) References Cited

U.S. PATENT DOCUMENTS 5,886,440 A * 3/1999 Hasebe ................... H02K 21/14
310/156.19
9,878,784 B2 * 1/2018 Erdozain, Jr. ........... B64C 11/02
(Continued)

FOREIGN PATENT DOCUMENTS

| CN | 105490491 | 4/2016 |
| CN | 105515243 | 4/2016 |

(Continued)

OTHER PUBLICATIONS

International Search Report dated Nov. 13, 2017 issued in Application No. PCT/KR2017/008391.
(Continued)

*Primary Examiner* — Brady W Frazier
(74) *Attorney, Agent, or Firm* — KED & Associates LLP (57) ABSTRACT

The present invention provides a motor for a drone, comprising: a rotary shaft; a stator including a hole in which a rotary shaft is arranged; and a rotor arranged on the outer side of the stator, wherein the rotor comprises: a cover part coupled with the rotary shaft and covering the upper part of the stator; a body part covering a side portion of the stator; and a plurality of magnets arranged on an inner circumferential surface of the body part so as to be spaced from each other, wherein the body part includes a plurality of groove portions arranged so as to be spaced from each other, thereby providing an advantageous effect of reducing the weight of a drone by reducing the weight of the rotor.

13 Claims, 8 Drawing Sheets

(51) Int. Cl.
*B64C 27/12* (2006.01)
*B64D 35/02* (2006.01)
*H02K 1/27* (2006.01)

(52) U.S. Cl.
CPC ........... *B64D 35/02* (2013.01); *H02K 1/2786* (2013.01); *B64C 2201/027* (2013.01); *B64C 2201/042* (2013.01); *B64C 2201/108* (2013.01); *B64C 2201/146* (2013.01); *B64C 2201/165* (2013.01)

(58) Field of Classification Search
CPC ........ B64C 2201/042; B64C 2201/108; B64C 2201/146; B64C 2201/165; B64D 35/02; H02K 1/2786
USPC .......................................................... 244/55
See application file for complete search history.

(56) References Cited

U.S. PATENT DOCUMENTS

2013/0127284 A1  5/2013  Hamann et al.
2017/0074272 A1* 3/2017  Horng .................... B64C 11/00

FOREIGN PATENT DOCUMENTS

| JP | 2001-346345 | 12/2001 |
| JP | 2010-022107 | 1/2010 |
| JP | 2013-236542 | 11/2013 |
| JP | 2015-195725 | 11/2015 |
| JP | 2015195725 A * | 11/2015 |

OTHER PUBLICATIONS

Chinese Office Action dated Apr. 23, 2020 issued in Application No. 201780048926.X.

* cited by examiner

MOTOR FOR DRONE AND DRONE INCLUDING SAME

CROSS-REFERENCE TO RELATED PATENT APPLICATIONS

This application is a U.S. National Stage Application under 35 U.S.C. § 371 of PCT Application No. PCT/KR2017/008391, filed Aug. 3, 2017, which claims priority to Korean Patent Application No. 10-2016-0098918, filed Aug. 3, 2016, whose entire disclosures are hereby incorporated by reference.

TECHNICAL FIELD

An embodiment relates to a motor for a drone and a drone including the same.

BACKGROUND ART

A drone is an unmanned aerial vehicle which includes a drone body with a plurality of propellers mounted thereon and flies. The drone body includes a motor which drives the propeller. A rotor of the motor rotates due to an electrical interaction between a stator and the rotor such that the motor drives the propeller. Here, the rotor may be disposed outside the stator. The rotor may include a body portion and a magnet. The magnet may be attached to an inner circumferential surface of the body portion.

Meanwhile, weight reduction is very important for drones. Particularly, since a drone is driven by a battery, it is necessary to reduce a weight thereof and efficiency of a motor thereof is important.

DISCLOSURE

Technical Problem

The present invention is directed to providing a motor for a drone, capable of improving performance of the motor while reducing a weight of the drone, and a drone including the motor.

Aspects of the embodiment are not limited to the above-stated aspect and unstated other aspects can be clearly understood by those skilled in the art from the following description.

Technical Solution

One aspect of the present invention provides a motor for a drone, the motor including a rotating shaft, a stator including a hole in which the rotating shaft is disposed, and a rotor disposed outside the stator. Here, the rotor includes a cover portion which is combined with the rotating shaft and covers a top of the stator, a body portion which covers a side part of the stator, and a plurality of magnets which are arranged on an inner circumferential surface of the body portion while being spaced apart from each other. Also, the body portion includes a plurality of groove portions which are arranged while being spaced apart from each other.

The groove portions may be extended in an axial direction of the rotating shaft.

A shortest distance between the groove portions may be greater than or equal to a shortest distance between the magnets.

The inner circumferential surface of the body portion may include a first surface and a second surface in a circumferential direction. Here, an inner diameter of the first surface may be greater than an inner diameter of the second surface, and the groove portion may include the first surface.

The first surface and the second surface may be alternately arranged in the circumferential direction of the inner circumferential surface.

The magnet may come into contact with the first surface.

A thickness of the magnet may be smaller than or equal to a difference between an inner diameter of the first surface and an inner diameter of the second surface.

The thickness of the magnet may be greater than the difference between the inner diameter of the first surface and the inner diameter of the second surface.

The difference between the inner diameter of the first surface and the inner diameter of the second surface may be within a range of 9% to 11% of the thickness of the magnet.

The magnet may come into contact with a part of the second surface.

A length of the first surface in a circumferential direction may be 93% to 97% of a length of the magnet in the circumferential direction.

The inner circumferential surface of the body portion may include a third surface. Here, the third surface may connect the first surface to the second surface, and the magnet may come into contact with the third surface.

Another aspect of the present invention provides a motor for a drone, the motor including a rotating shaft, a stator including a hole in which the rotating shaft is disposed, and a rotor disposed outside the stator. Here, the rotor includes a cover portion which is combined with the rotating shaft and covers a top of the stator, a body portion which covers a side part of the stator, and a magnet combined with the body portion. The body portion includes a plurality of protrusion portions which are arranged on an inner circumferential surface thereof while being spaced apart from each other, and the magnet is disposed between the protrusion portions.

The protrusion portions may be extended in an axial direction of the rotating shaft.

A width of the protrusion portion in a circumferential direction may be greater than or equal to a shortest distance between such magnets.

The inner circumferential surface of the body portion may include a first surface, a second surface, and a third surface. An inner diameter of the first surface may be greater than an inner diameter of the second surface, and the third surface may connect the first surface to the second surface. The protrusion portion may include the second surface and the third surface.

The magnet may come into contact with the first surface and the third surface.

The magnet may come into contact with a part of the second surface.

Another aspect of the present invention provides a motor for a drone, the motor including a rotating shaft, a stator including a hole in which the rotating shaft is disposed, and a rotor disposed outside the stator. Here, the rotor includes a cover portion which is combined with the rotating shaft and covers a top of the stator, a body portion which covers a side part of the stator, and a plurality of magnets which are arranged on an inner circumferential surface of the body portion while being spaced apart from each other. Here, the magnets include groove portions which come into contact with the body portion.

The inner circumferential surface of the body portion may include a first surface, a second surface, and a third surface. An inner diameter of the first surface may be greater than an inner diameter of the second surface, and the third surface may connect the first surface to the second surface. The groove portion may come into contact with the second surface and the third surface.

Another aspect of the present invention provides a drone including a drone body, a motor combined with the drone body, and a propeller which is combined with the motor and rotates. Here, the motor includes a rotating shaft, a stator including a hole in which the rotating shaft is disposed, and a rotor disposed outside the stator. Here, the rotor includes a cover portion which is combined with the rotating shaft and covers a top of the stator, a body portion which covers a side part of the stator, and a plurality of magnets which are arranged on an inner circumferential surface of the body portion while being spaced apart from each other. Also, the body portion includes a plurality of groove portions which are arranged while being spaced apart from each other.

Another aspect of the present invention provides a drone including a drone body, a motor combined with the drone body, and a propeller which is combined with the motor and rotates. Here, the motor includes a rotating shaft, a stator including a hole in which the rotating shaft is disposed, and a rotor disposed outside the stator. Here, the rotor includes a cover portion which is combined with the rotating shaft and covers a top of the stator, a body portion which covers a side part of the stator, and a magnet combined with the body portion. The body portion includes a plurality of protrusion portions which are arranged on an inner circumferential surface thereof while being spaced apart from each other, and the magnet is disposed between the protrusion portions.

Another aspect of the present invention provides a drone including a drone body, a motor combined with the drone body, and a propeller which is combined with the motor and rotates. Here, the motor includes a rotating shaft, a stator including a hole in which the rotating shaft is disposed, and a rotor disposed outside the stator. Here, the rotor includes a cover portion which is combined with the rotating shaft and covers a top of the stator, a body portion which covers a side part of the stator, and a plurality of magnets which are arranged on an inner circumferential surface of the body portion while being spaced apart from each other. Here, the magnets include groove portions which come into contact with the body portion.

Advantageous Effects

According to an embodiment, an advantageous effect of reducing a weight of a drone is provided by forming groove portions in a body portion of a rotor to reduce a weight of the rotor.

According to the embodiment, an advantageous effect of improving performance of a motor while reducing a size of magnets is provided by forming a greater thickness of an area of the body portion corresponding to a space between the magnets than a thickness of the groove portions to increase an area in which magnetic flux is saturated.

According to the embodiment, an advantageous effect of removing an additional jig for aligning the magnets is provided by attaching the magnets to the groove portions arranged on an inner circumferential surface of the body portion.

MODES OF THE INVENTION

Hereinafter, an exemplary embodiment of the present invention will be described in detail with reference to the attached drawings. The purpose, particular advantages, and novel features of the present invention will be more clearly understood from the following detailed description and the exemplary embodiment which are related to the attached drawings. Also, the terms used in the specification and the claims should not be limited to general or lexical meanings and should be interpreted as meanings and concepts coinciding with the technical concept of the present invention on the basis of a principle in which the inventor can appropriately define the concepts of the terms to describe the invention in the best manner. Also, a detailed description on well-known related art that may unnecessarily obscure the essential of the present invention will be omitted.

Figure 1:
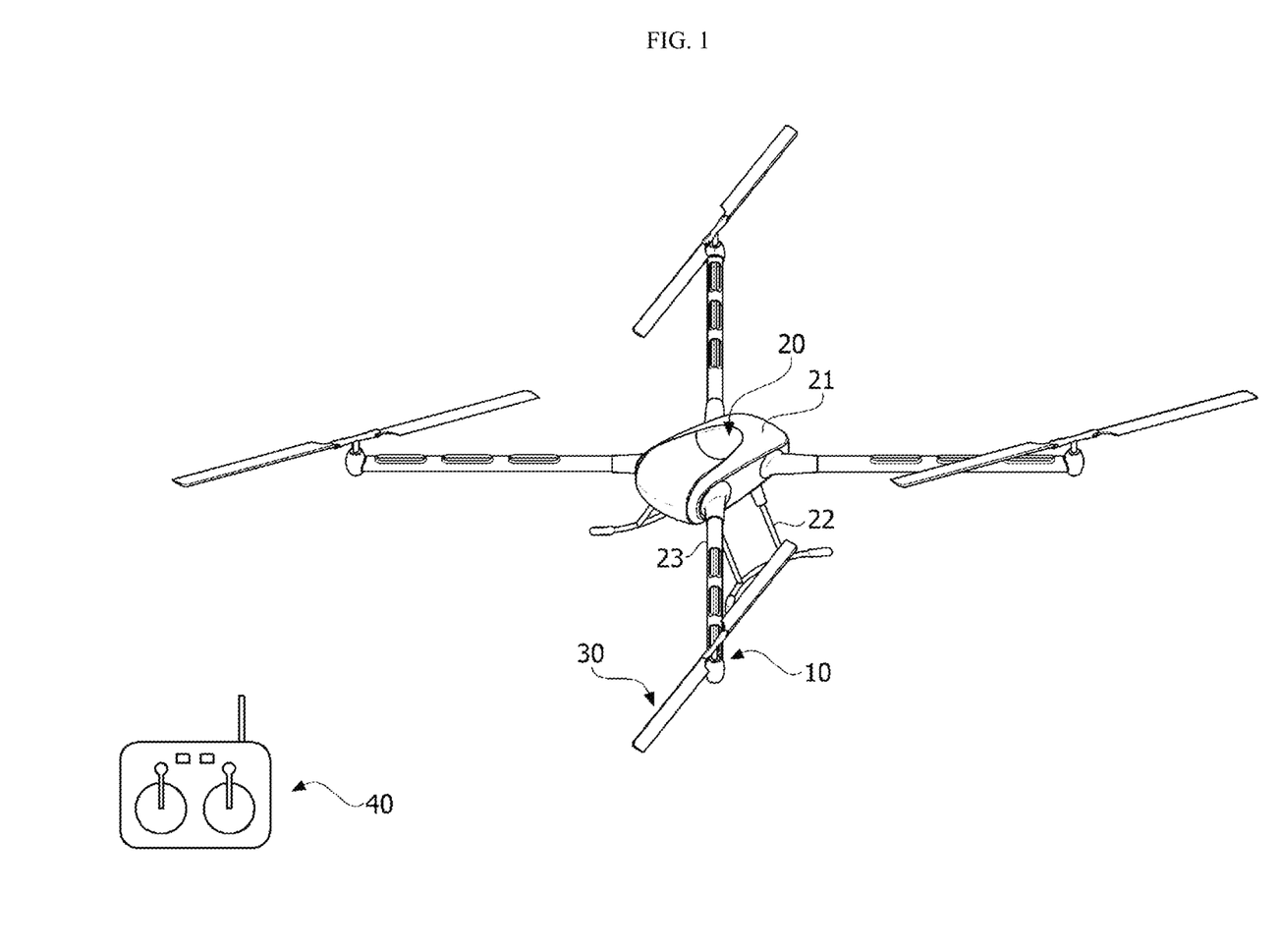
FIG. 1 is a view of a drone according to an embodiment.
Figure 2:
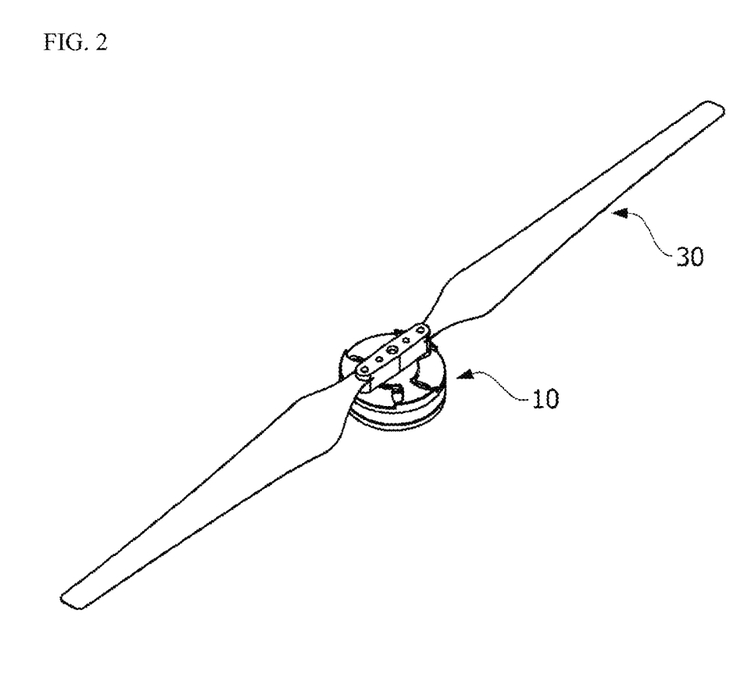
FIG. 2 is a view illustrating a motor and a propeller.

FIG. 1 is a view of a drone according to an embodiment, and FIG. 2 is a view illustrating a motor and a propeller.

Referring to FIGS. 1 and 2, the drone according to the embodiment may include a motor 10, a drone body 20, a propeller 30, and a controller 40. Here, the drone body 20 may include a main body 21, landing means 22, and a propeller support portion 23.

The drone body 20 forms an exterior of the drone. The drone body 20 includes a plurality of such propeller support portions 23. The plurality of propeller support portions 23 are radially formed from the main body 21. The motor 10 may be mounted on each of the propeller support portions 23. The propeller 30 is mounted on each of such motors 10. Also, a wireless type controller 40, which controls driving of the motors 10, may be included.

Figure 3:
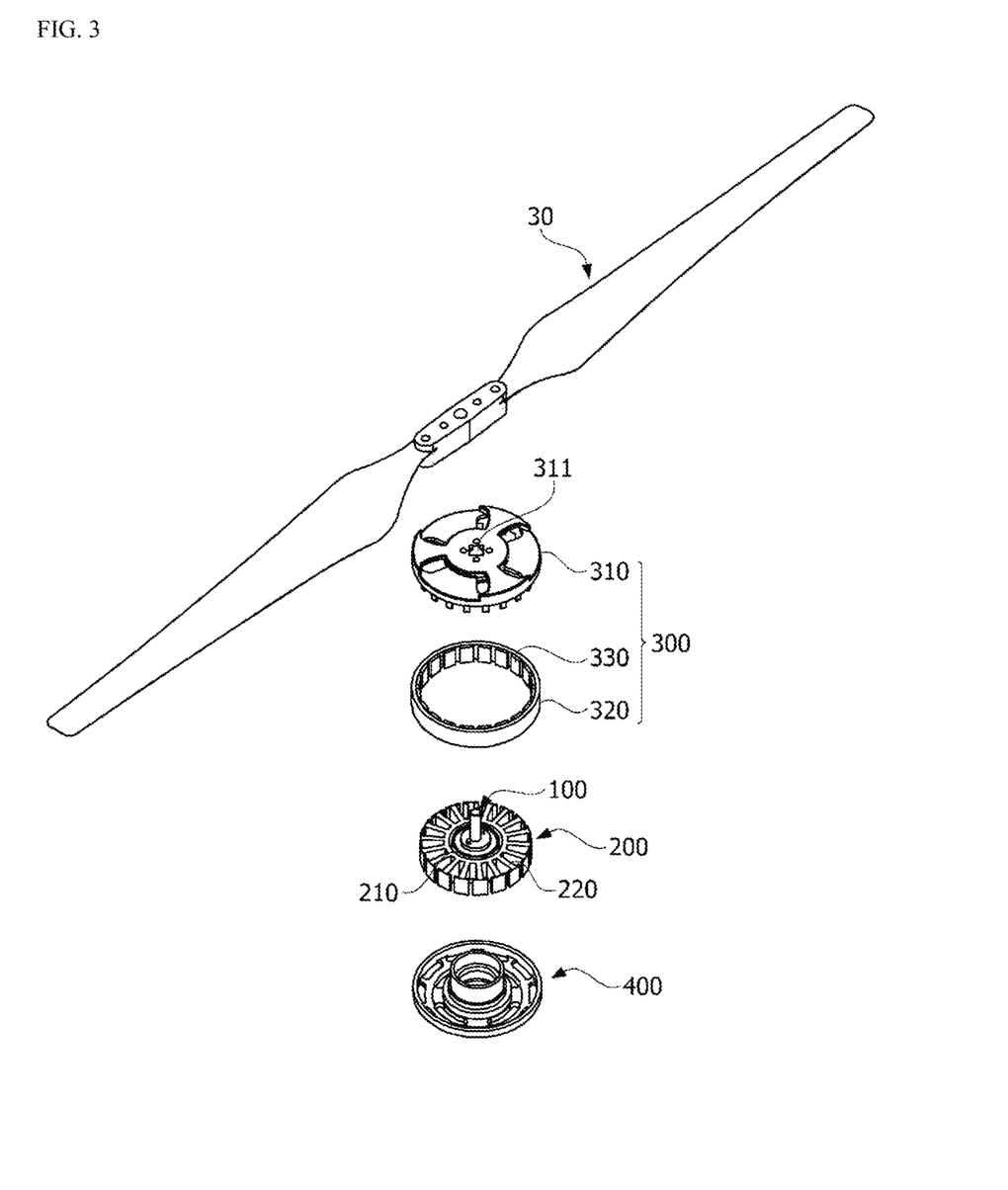
FIG. 3 is an exploded view of the motor.

FIG. 3 is an exploded view of the motor.

Referring to FIG. 3, the motor 10 may include a rotating shaft 100, a stator 200, a rotor 300, and a housing 400.

The rotating shaft 100 is disposed to pass through a center of the stator 200. The rotating shaft 100 may be rotatably combined with a hole 210 of a stator core 220. The rotating shaft 100 is connected to the propeller 30 and a cover portion 310 and transfers a driving force of the motor 10 to the propeller 30.

The stator 200 causes an electrical interaction with the rotor 300 and induces the rotor 300 to rotate. The stator 200 includes the stator core 220, and a coil may be wound on the stator core 220.

The stator core 220 may include an annular yoke, and a plurality of teeth protruding outward may be provided on the yoke. A coil may be wound on each of the teeth. The teeth may be provided at certain intervals along a circumference of the yoke.

The stator core 220 may be formed by stacking a plurality of plates having a thin steel plate shape. Otherwise, the stator core 220 may be configured as a single product formed of a cylinder. Also, the stator core 220 may be formed by mutually combining or connecting a plurality of divided cores. Each of the divided cores may also be formed by stacking a plurality of plates having a thin steel plate shape or configured as a single product formed of a cylinder.

The hole 210 may be formed in a center of the stator core 220. The rotating shaft 100 passes through the hole 210.

The rotor 300 is disposed outside the stator 200. The rotor 300 may include the cover portion 310, a body portion 320, and magnets 330.

The cover portion 310 covers a top of the stator 200. The body portion 320 covers a side part of the stator 200. The cover portion 310 and the body portion 320 may be formed to surround the stator 200 overall. These are components for preventing water or foreign substances from flowing into the motor 10. A hole 311, through which the rotating shaft 100 passes, may be formed at a center of the cover portion 310.

The body portion 320 surrounds the side part of the stator 200. The body portion 320 is formed to have a hollow tubular shape. The body portion 320 is disposed such that an inner circumferential surface thereof faces the teeth of the stator core 220. The magnets 330 may be attached to the inner circumferential surface of the body portion 320. The body portion 320 corresponds to a yoke which forms a magnetic path of the magnets 330.

A top end of the body portion 320 may be combined with a top surface part of the cover portion 310. The body portion 320 and the cover portion 310 may be manufactured as an integral form by doubly injection-molding separate materials or may be manufactured as a single product. A bottom end of the body portion 320 may be combined with the housing 400.

The magnets 330 are combined with the inner circumferential surface of the body portion 320. The magnets 330 cause an electrical interaction with the coil wound on the stator core 220.

Meanwhile, the stator 200 is located in an internal space formed by the cover portion 310, the body portion 320, and the housing 400.

Figure 4:
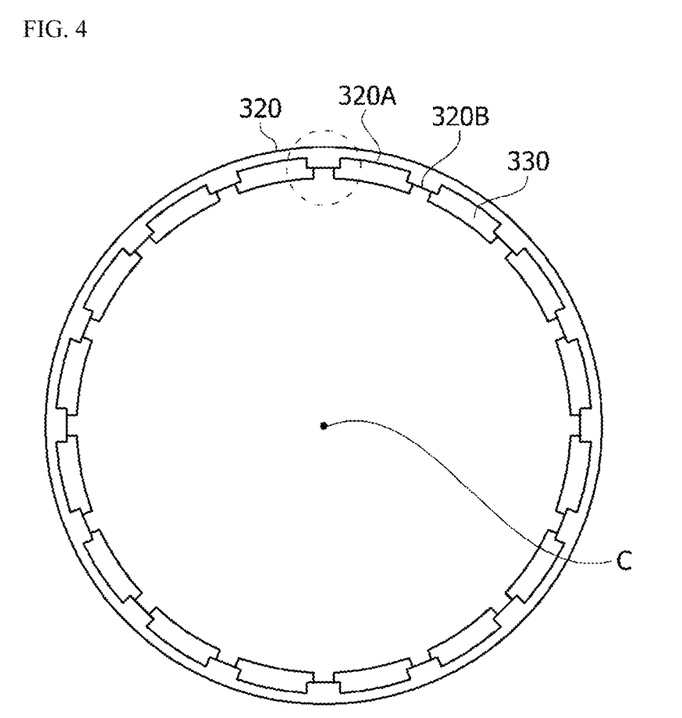
FIG. 4 is a view illustrating a body portion and magnets of a rotor.

FIG. 4 is a view illustrating the body portion and magnets of the rotor.

Referring to FIG. 4, the body portion 320 of the rotor 300 may include a groove portion 320A and a protrusion portion 320B.

The magnet 330 is mounted on the groove portion 320A. A plurality of such groove portions 320A are arranged along the inner circumferential surface of the body portion 320. The groove portions 320A may be arranged along a circumferential direction based on a center C of the body portion 320 while being spaced apart from each other.

Figure 5:
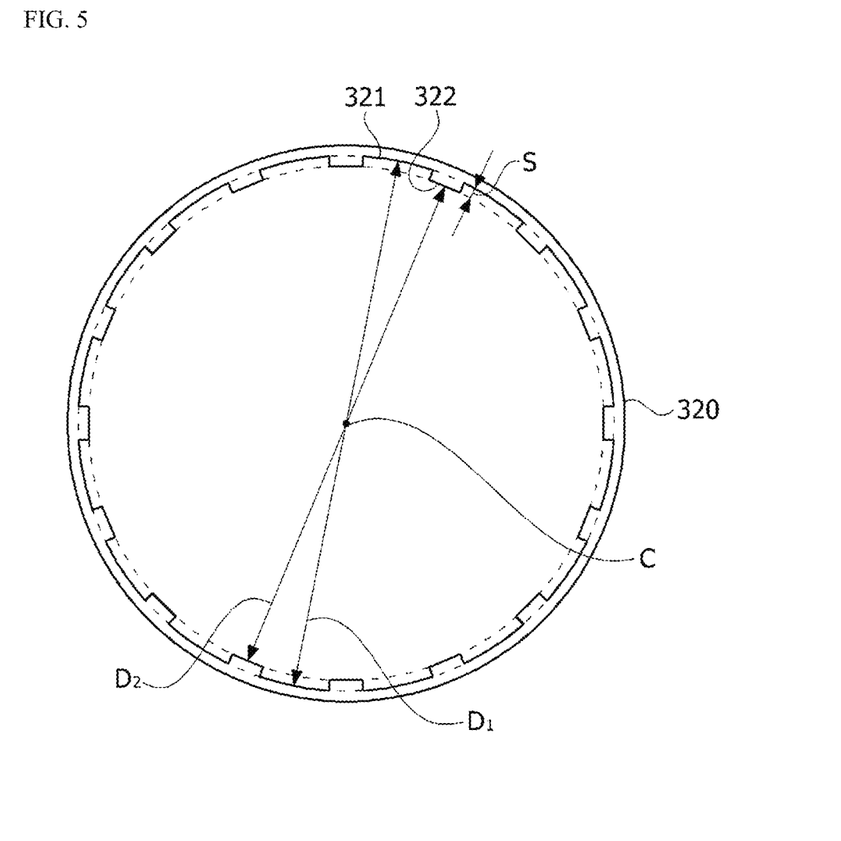
FIG. 5 is a view illustrating a first surface and a second surface of the body portion.

FIG. 5 is a view illustrating a first surface and a second surface of the body portion.

Referring to FIGS. 4 and 5, the inner circumferential surface of the body portion 320 may include a first surface 321 and a second surface 322 in the circumferential direction. An inner diameter D1 of the first surface 321 is formed to be greater than an inner diameter D2 of the second surface 322. Accordingly, the first surface 321 is formed to be relatively concave in comparison to the second surface 322.

The first surface 321 and the second surface 322 are alternately arranged in the circumferential direction.

Here, the groove portion 320A includes the first surface 321. The magnet 330 is attached to the groove portion 320A.

A plurality of such protrusion portions 320B are arranged along the inner circumferential surface of the body portion 320. The protrusion portions 320B may be arranged along the circumferential direction based on the center C of the body portion 320 while being spaced apart from each other. The groove portion 320A is disposed between the protrusion portions 320B, and the magnet 330 is attached thereto. Here, the protrusion portion 320B may guide the magnet 330 to be attached. Accordingly, an additional jig for guiding the magnet 330 to an attachment position is unnecessary. As a result thereof, an advantage of reducing manufacturing processes and costs is present.

Figure 6:
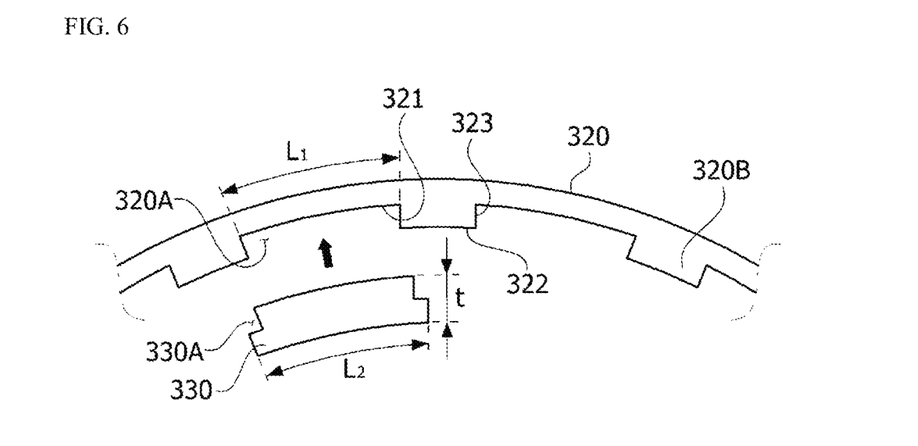
FIG. 6 is a view illustrating the magnet to be attached to the body portion.

FIG. 6 is a view illustrating the magnet to be attached to the body portion.

Referring to FIGS. 5 and 6, the magnet 330 may be attached to the groove portion 320A. The magnet 330 comes in contact with the first surface 321.

Here, a thickness t of the magnet 330 may be greater than a difference (refer to FIG. 5 for S) between the inner diameter D1 of the first surface 321 and the inner diameter D2 of the second surface 322. Accordingly, the magnet 330 protrudes toward an inside of the second surface 322. The difference (refer to FIG. 5 for S) between the inner diameter D1 of the first surface 321 and the inner diameter D2 of the second surface 322 may be within a range of 9% to 11% of the thickness t of the magnet 330.

The inner surface of the body portion 320 may include a third surface 323. The third surface 323 is a part which connects the first surface 321 and the second surface 322 to each other which form a step therebetween.

Meanwhile, the magnet 330 may include a groove portion 330A. The groove portion 330A may be attached to the second surface 322 and the third surface 323 of the body portion 320. A length L1 of the first surface 321 in the circumferential direction may be 93% to 97% of a length L2 of the magnet 330 in the circumferential direction. Both side end parts of the magnet 330, which deviate from the first surface 321 on the basis of the circumferential direction, come into contact with the second surface 322.

Figure 7:
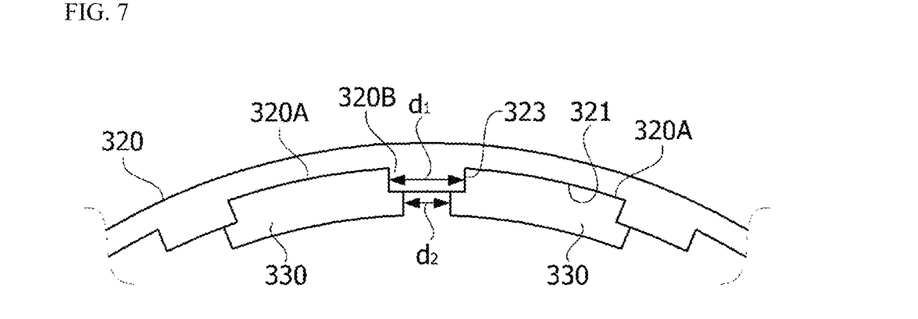
FIG. 7 is a view illustrating the body portion to which the magnets are attached.

FIG. 7 is a view illustrating the body portion to which the magnets are attached.

Referring to FIGS. 6 and 7, the magnet 330 is attached to the groove portion 320A. Here, the magnet 330 protrudes from the second surface 322. Also, since the length L2 of the magnet 330 in the circumferential direction is greater than the length L1 of the first surface 321 in the circumferential direction, a part of the magnet 330 may be mounted on the second surface 322. In other words, a shortest distance d1 between the adjacent groove portions 330A may be greater than a shortest distance d2 between the magnets 330 mounted on the adjacent groove portions 330A.

Figure 8:
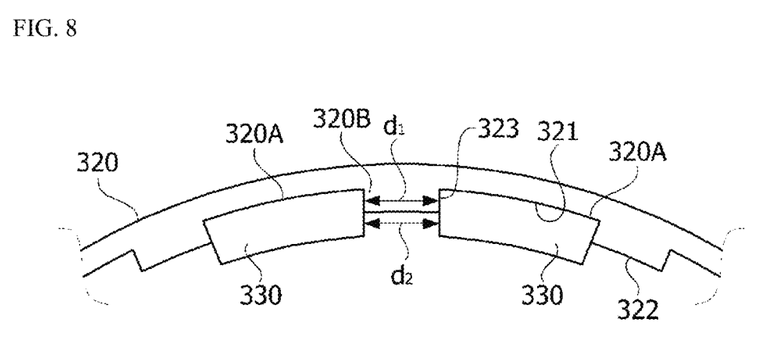
FIG. 8 is a view illustrating a modified example of groove portions of the body portion.

FIG. 8 is a view illustrating a modified example of the groove portions of the body portion.

Referring to FIG. 8, the magnet 330 may be attached to only the first surface 321 and the third surface 323. In other words, a shortest distance d1 between the adjacent groove portions 330A may be equal to a shortest distance d2 between the magnets 330 mounted on the adjacent groove portions 330A.

Figure 9:
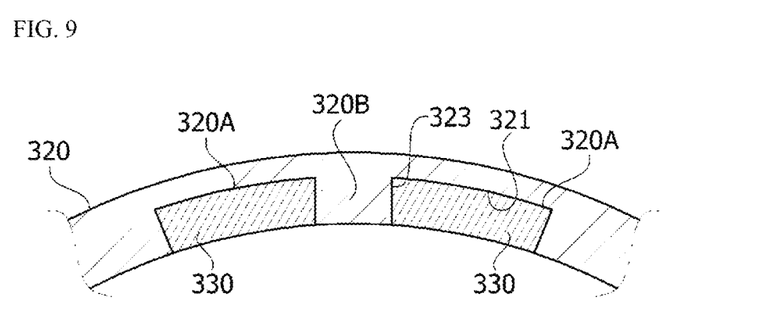
FIG. 9 is a view illustrating another modified example of groove portions of the body portion.

FIG. 9 is a view illustrating another modified example of the groove portions of the body portion.

Referring to FIG. 9, the magnet 330 may be attached to only the first surface 321 and the third surface 323. Also, the magnet 330 may be completely inserted into the groove portion 320A not to protrude from the second surface 322.

Figure 10:
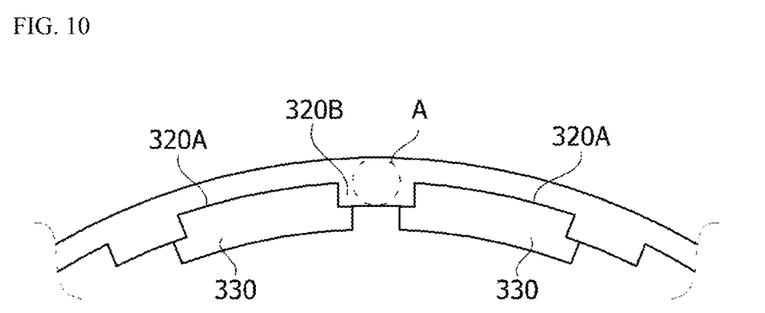
FIG. 10 is a view illustrating an area in which magnetic flux is saturated.

FIG. 10 is a view illustrating an area in which magnetic flux is saturated.

Referring to FIGS. 4 and 10, the groove portion 320A is concavely formed on the inner circumferential surface of the body portion 320. Accordingly, a thickness of the body portion 320 may be reduced in an area in which the groove portion 320A is located. When the thickness of the body portion 320 is reduced, a weight of the drone may be reduced.

Meanwhile, the protrusion portion 320B may be disposed between the adjacent magnets 330. An area A in FIG. 10 is an area in which magnetic flux of the magnets 330 is saturated while flowing through the body portion 320. The protrusion portion 320B is formed in the area A in FIG. 10 such that a saturation area of the magnetic flux is extended. Accordingly, since a flow of the magnetic flux is enhanced by the protrusion portion 320B, intended performance of the motor may be secured while reducing a size of the magnets 330.

When the size of the magnets 330 is reduced, the weight of the drone may be more reduced.

TABLE 1

| Classification | Case 1 | Case 2 | Case 3 |
| --- | --- | --- | --- |
| ke | 0.0688 | 0.0699 | 0.067 |

Case 1 corresponds to a motor including a rotor with general-sized magnets with the groove portions 320A and the protrusion portions 320B being absent in the body portion 320.

Case 2 corresponds to the motor, as shown in FIG. 7, in which the groove portions 320A and the protrusion portions 320B are included in the body portion 320 and which includes the rotor to which the magnets 330 including the groove portions 330A and protruding from the inner circumferential surface of the body portion 320 are attached. Here, the magnets 330 are smaller than the magnets of Case 1.

Case 3 corresponds to the motor, as shown in FIG. 9, in which the groove portions 320A and the protrusion portions 320B are included in the body portion 320 and which includes the rotor to which the magnets 330 are attached while being completely inserted in the groove portions 320A. Here, the magnets 330 are smaller than the magnets of Case 1.

In Table 1, ke is a constant of a counter electro-motive force and is a value in proportion to torque generated per unit current.

As shown in Table 1, as a result of measuring torques in Case 1, Case 2, and Case 3, it is seen that although the sizes of the magnets of Case 2 and Case 3 are smaller than the size of the magnets of Case 1, there are no significant differences among torques measured in Case 1, Case 2, and Case 3.

Accordingly, it may be seen that the size of the magnets 330 may be reduced without deterioration in motor performance by securing a saturation area through the protrusion portion 320B.

Figure 11:
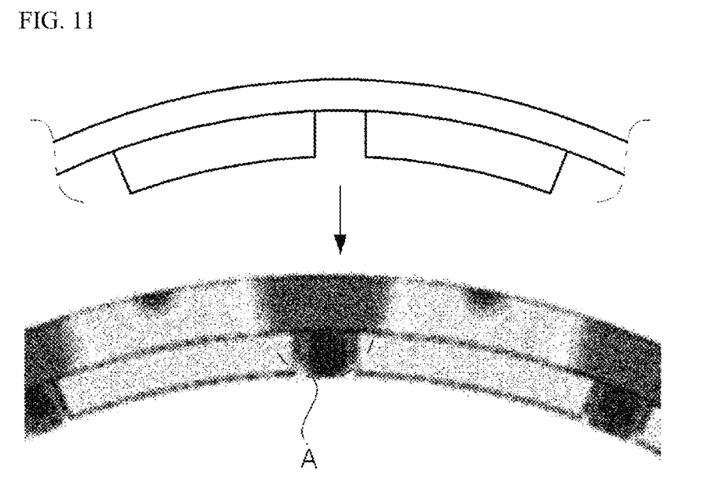
FIG. 11 is a view illustrating a magnetic flux saturation state in which a protrusion portion is not present.
Figure 12:
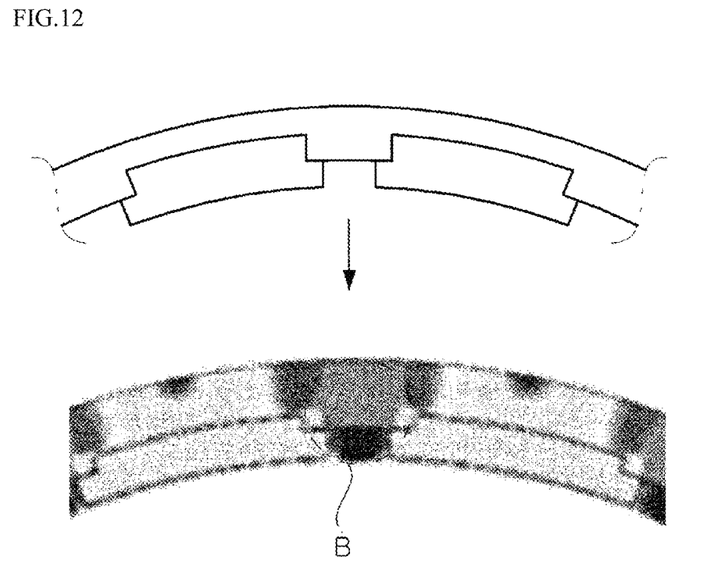
FIG. 12 is a view illustrating a magnetic flux saturation state in which a protrusion portion is present.

FIG. 11 is a view illustrating a magnetic flux saturation state in which a protrusion portion is not present, and FIG. 12 is a view illustrating a magnetic flux saturation state in which a protrusion portion is present.

Referring to FIGS. 11 and 12, an area B of FIG. 11 is a magnetic flux saturation area in Case 1. As shown in FIG. 11, since the area B of FIG. 11 is shown in scarlet red, it may be seen that a saturation level of magnetic flux is high.

On the other hand, an area C of FIG. 12 is a magnetic flux saturation area in Case 2. As shown in FIG. 12, since the area C of FIG. 12 is shown in light red, it may be seen that a magnetic flux saturation is released.

As described above, the motor for a drone and the drone including the same according to one exemplary embodiment of the present invention have been described in detail with reference to the attached drawings.

The above description is merely for exemplarily describing the technical concept of the present invention, and a variety of modifications, changes, and replacements thereof may be made by one of ordinary skill in the art to which the present invention pertains without departing from the essential features of the present invention. Accordingly, the embodiment disclosed herein and the attached drawings are not intended to limit but merely explain the technical concept of the present invention, and the scope of the present invention should not be limited by the above embodiment and the attached drawings. The scope of the present invention should be interpreted by the following claims and all technical concepts within the equivalent scope thereof should be interpreted as being included in the scope of the present invention.

DESCRIPTION OF REFERENCE NUMERALS

10: motor, 20: drone body, 30: propeller, 40: controller, 100: rotating shaft, 200: stator, 300: rotor, 310: cover portion, 320: body portion, 320A: groove portion, 320B: protrusion portion, 321: first surface, 322: second surface, 323: third surface, 330: magnet, 330A: groove portion

The invention claimed is:

1. A motor for a drone, the motor comprising:
   a rotating shaft;
   a stator comprising a hole in which the rotating shaft is disposed; and
   a rotor disposed outside the stator,
   wherein the rotor comprises:
      a cover portion which is combined with the rotating shaft and covers a top of the stator;
      a body portion which covers a side part of the stator; and
      a plurality of magnets which are arranged on an inner circumferential surface of the body portion while being spaced apart from each other, each of the magnets has a curved inner circumferential surface that faces the stator,
   wherein the body portion comprises a plurality of groove portions which are arranged while being spaced apart from each other, and a plurality of protrusion portions which are arranged while being spaced apart from each other,
   wherein a part of one of the plurality of magnets is mounted on each of the groove portions, and another part of the one of the plurality of magnets is mounted on each of the protrusion portions,
   wherein a length of the curved inner circumference surface of one of the plurality of magnets in a circumferential direction is greater than a length of each of the groove portions in the circumferential direction.

2. The motor of claim 1, wherein the groove portions are extended in an axial direction of the rotating shaft.

3. The motor of claim 1, wherein a shortest distance between the groove portions is greater than a shortest distance between the magnets.

4. The motor of claim 1, wherein the inner circumferential surface of the body portion comprises a first surface and a second surface in a circumferential direction,
wherein an inner diameter of the first surface is greater than an inner diameter of the second surface, and
wherein each of the groove portions comprises the first surface.

5. The motor of claim 4, wherein the first surface and the second surface are alternately arranged in the circumferential direction of the inner circumferential surface of the body portion.

6. The motor of claim 5, wherein each of the magnets comes into contact with the first surface.

7. The motor of claim 4, wherein the inner circumferential surface of the body portion comprises a third surface,
wherein the third surface connects the first surface to the second surface, and
wherein each of the magnets comes into contact with the third surface.

8. A drone comprising:
a drone body;
a motor combined with the drone body; and
a propeller which is combined with the motor and configured to rotate,
wherein the motor comprises:
   a rotating shaft;
   a stator comprising a hole in which the rotating shaft is disposed; and
   a rotor disposed outside the stator,
   wherein the rotor comprises:
      a cover portion which is combined with the rotating shaft and covers a top of the stator;
      a body portion which covers a side part of the stator; and
      a plurality of magnets which are arranged on an inner circumferential surface of the body portion while being spaced apart from each other, each of the magnets has a curved inner surface that faces the stator,
   wherein the body portion comprises a plurality of groove portions which are arranged while being spaced apart from each other, and a plurality of protrusion portions which are arranged while being spaced apart from each other,
   wherein a first part of each of the plurality of magnets is mounted on a separate one of each of the groove portions, and a second part of each of the plurality of magnets is mounted on a separate one of each of the protrusion portions, and
   wherein a length, in a circumferential direction, of the curved inner surface of one of the plurality of magnets is greater than a length, in the circumferential direction of a corresponding one of the groove portions.

9. The motor of claim 7, wherein a difference between the inner diameter of the first surface and the inner diameter of the second surface is within a range of 9% to 11% of a thickness, in a radial direction, of one of the plurality of magnets.

10. The motor of claim 1, wherein a length of each of the groove portions in the circumferential direction is 93% to 97% of the length of the curved inner circumferential surface of one of the plurality of magnets in the circumferential direction.

11. The drone of claim 8, wherein the inner circumferential surface of the body portion comprises a plurality of first surfaces in a circumferential direction and a plurality of second surfaces in the circumferential direction,
wherein an inner radius from a center of the body portion to one of the first surfaces is greater than an inner radius from the center of the body portion to one of the second surface, and
wherein each of the groove portions includes a separate one of the first surfaces.

12. The drone of claim 11, wherein each of the magnets contacts a separate one of the first surfaces.

13. The drone of claim 12, wherein the body portion comprises a plurality of third surfaces,
wherein each of the third surfaces connects a corresponding one of the first surfaces to a corresponding one of the second surfaces, and
wherein each of the magnets contacts a separate one of the third surfaces.

* * * * *